United States Patent
Ozdemir et al.

(10) Patent No.: US 9,835,126 B2
(45) Date of Patent: Dec. 5, 2017

(54) STARTER MOTOR

(71) Applicant: REMY TECHNOLOGIES, L.L.C., Pendleton, IN (US)

(72) Inventors: Muhammed Emin Ozdemir, Noblesville, IN (US); Steve Burton, Anderson, IN (US); Joel M. Gray, Fishers, IN (US)

(73) Assignee: BORGWARNER INC., Auburn Hills, MI (US)

( * ) Notice: Subject to any disclaimer, the term of this patent is extended or adjusted under 35 U.S.C. 154(b) by 54 days.

(21) Appl. No.: 14/743,417

(22) Filed: Jun. 18, 2015

(65) Prior Publication Data

US 2015/0369200 A1 Dec. 24, 2015

Related U.S. Application Data

(60) Provisional application No. 62/013,848, filed on Jun. 18, 2014.

(51) Int. Cl.
*F02N 11/08* (2006.01)
*H02K 5/04* (2006.01)
*H02K 5/22* (2006.01)
*H01H 51/06* (2006.01)
*F02N 15/06* (2006.01)

(52) U.S. Cl.
CPC ........ *F02N 11/0851* (2013.01); *F02N 11/087* (2013.01); *H01H 51/065* (2013.01); *H02K 5/225* (2013.01); *F02N 11/0844* (2013.01); *F02N 15/067* (2013.01)

(58) Field of Classification Search
CPC .............. F02N 11/0851; F02N 11/087; F02N 11/0844; F02N 15/067; H01H 51/065; H02K 5/225
USPC ........................................................ 290/38 R
See application file for complete search history.

(56) References Cited

U.S. PATENT DOCUMENTS

| 4,720,126 | A | * | 1/1988 | Mike | H01H 51/065 123/179.25 |
|---|---|---|---|---|---|
| 5,892,421 | A | * | 4/1999 | Matsushima | F02N 11/00 290/38 R |
| 8,237,524 | B2 | | 8/2012 | Niimi et al. | |
| 2008/0162007 | A1 | * | 7/2008 | Ishii | F02N 11/0855 701/54 |
| 2010/0033066 | A1 | * | 2/2010 | Murata | F02N 11/087 310/68 R |
| 2010/0257975 | A1 | * | 10/2010 | Niimi | F02N 11/087 74/7 C |
| 2010/0264670 | A1 | * | 10/2010 | Usami | F02N 11/087 290/38 R |

(Continued)

FOREIGN PATENT DOCUMENTS

JP 2011-074818 A 4/2011

*Primary Examiner* — Viet Nguyen
(74) *Attorney, Agent, or Firm* — Cantor Colburn LLP

(57) ABSTRACT

A starter motor of a vehicle is provided and includes a housing having a central longitudinal axis and at least first and second coils disposed within the housing. One of the at least first and second coils is configured to control driveshaft and ring gear engagement and the other one of the at least first and second coils is offset from the central longitudinal axis and configured to control an application of current to a motor disposed to drive rotation of a driveshaft of the vehicle.

18 Claims, 3 Drawing Sheets

(56) References Cited

U.S. PATENT DOCUMENTS

| | | | |
|---|---|---|---|
| 2010/0282200 A1* | 11/2010 | Notani | F02N 11/0844 123/179.3 |
| 2011/0095852 A1* | 4/2011 | Niimi | F02N 11/087 335/184 |
| 2012/0206220 A1* | 8/2012 | Niimi | H01H 51/065 335/71 |
| 2014/0041613 A1* | 2/2014 | Murata | F02N 11/0844 123/179.3 |
| 2014/0102395 A1* | 4/2014 | Fujita | F02N 11/0844 123/179.4 |
| 2015/0179366 A1* | 6/2015 | Kirita | F02N 11/0807 200/314 |
| 2015/0258882 A1* | 9/2015 | Holmes | B60K 6/485 180/65.26 |
| 2015/0285204 A1* | 10/2015 | Holguin Pallares | F02N 11/087 290/38 C |

\* cited by examiner

STARTER MOTOR

CROSS REFERENCE TO RELATED APPLICATION

This application is a Non-Provisional of U.S. Application Ser. No. 62/013,848 filed Jun. 18, 2014, the disclosures of which are incorporated by reference herein in its entirety.

BACKGROUND OF THE INVENTION

The subject matter disclosed herein relates to a starter motor and, more particularly, to a change-of-mind (COM) starter motor with an offset mag-switch coil.

A starter motor assembly of a vehicle typically includes a drive portion, a controller and a lever arm. The drive portion includes a motor, a driveshaft, which is drivable by the motor, and a ring gear coupled to an engine and disposed for engagement with a pinion of the driveshaft so that the engine can be driven by the motor. The driveshaft is movable by the controller via the lever arm to thereby engage with the ring gear via the pinion.

The controller may include a housing, a drive coil configured to control engagement of the driveshaft and the ring gear and a magnetic-switch coil configured to control an application of current to the motor. Typically, the drive and magnetic-switch coils are both coaxial with a central longitudinal axis of the housing, which results in a terminal assembly of the controller being disposed outside of an outer diameter of the housing.

BRIEF DESCRIPTION OF THE INVENTION

According to one aspect of the invention, a starter motor of a vehicle is provided and includes a housing having a central longitudinal axis and at least first and second coils disposed within the housing. One of the at least first and second coils is configured to control driveshaft and ring gear engagement and the other one of the at least first and second coils is offset from the central longitudinal axis and configured to control an application of current to a motor disposed to drive rotation of a driveshaft of the vehicle.

According to another aspect of the invention, a starter motor assembly of a vehicle is provided and includes a drive portion in which a driveshaft, which is drivable by a motor, is disposed for engagement with a ring gear coupled to a vehicle engine and a controller. The controller includes a housing having a central longitudinal axis and at least first and second coils operably disposed within the housing to control driveshaft and ring gear engagement and to control an application of current to the motor, respectively. The second coil is offset from the central longitudinal axis.

According to yet another aspect of the invention, a starter motor assembly of a vehicle is provided and includes a drive portion in which a driveshaft, which is drivable by a motor, is disposed for engagement with a ring gear coupled to a vehicle engine and a controller. The controller includes a housing having a central longitudinal axis, a drive coil disposed within the housing substantially coaxially with the central longitudinal axis and configured to drive axial movement of a plunger for controlling the driveshaft and ring gear engagement and a magnetic-switch coil disposed within the housing and offset from the central longitudinal axis and configured to control an application of current to the motor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a change-of-mind (COM) starter motor has two separate coil assemblies inside a solenoid assembly. The coil assemblies are horizontally in line with one another and with terminals/inputs being on one cylindrical side of the solenoid assembly, both coil assemblies have positive signal leads that will be terminated at the other cylindrical side. This means the drive coil signal lead of the prior art has to extend from the middle of the solenoid assembly through the motor switch coil assembly to its terminal. However, by shifting or offsetting the axis of the magnetic-switch coil assembly relative to the housing axis, space is created within the housing on a side thereof opposite the direction of offset. Within this space, passage for the positive lead of the drive coil is provided.

Moreover, substantially shifting the magnetic-switch coil center will cause its plunger to shift and will also affect its affiliated parts, such as terminals and contacts, the same way. The offsetting also allows the main cover connector of the solenoid assembly to shift without losing its functionality and, consequently, an amount of plastic material used will be reduced as a result of the shifting of the terminals and contacts. Therefore, the approach described below will make the solenoid cover more compact, more cost effective, electrically safer and environmentally friendlier than in the prior art.

Figure 1:
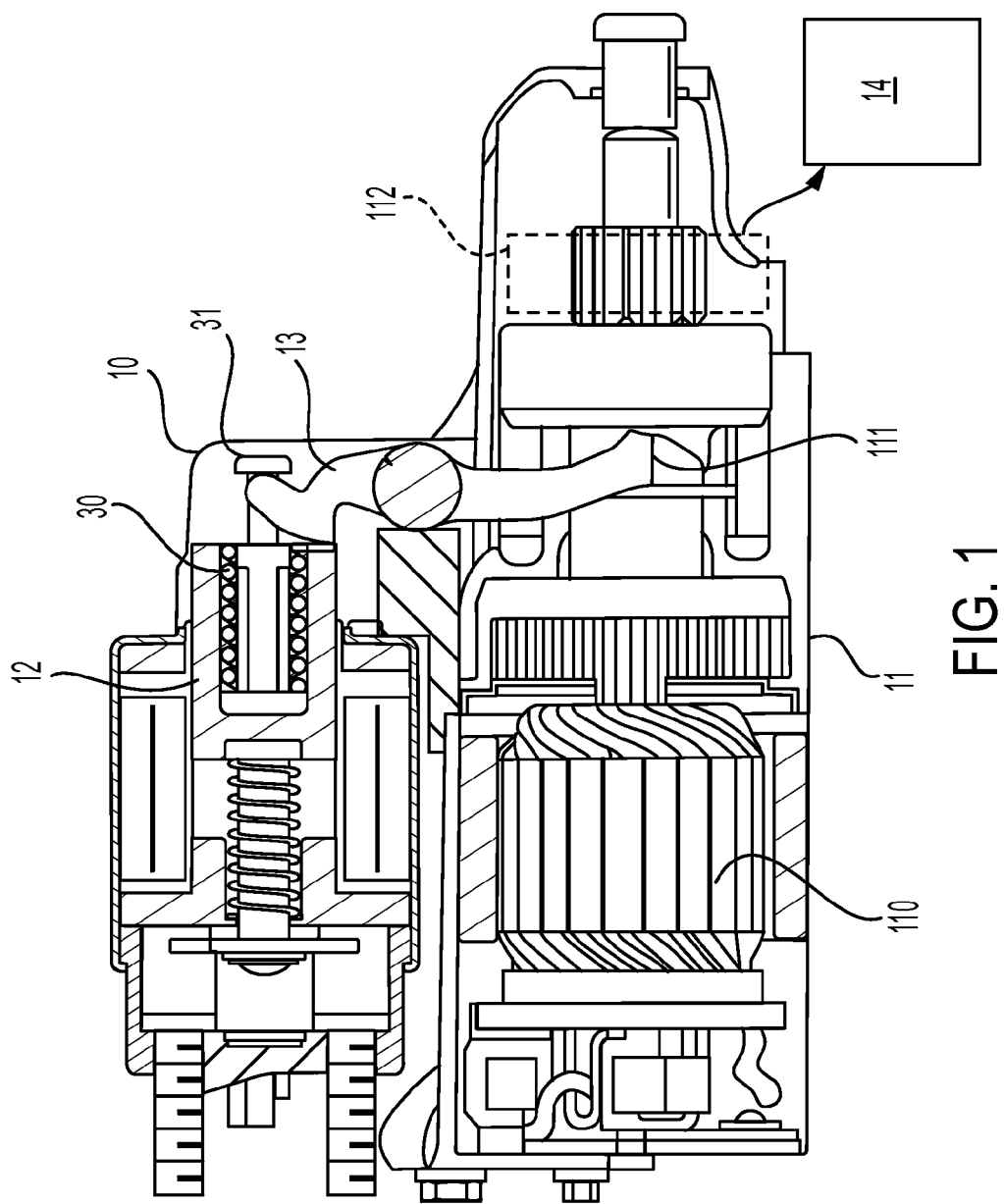
FIG. 1 is a side view of a starter motor assembly of a vehicle in accordance with embodiments.
Figure 2:
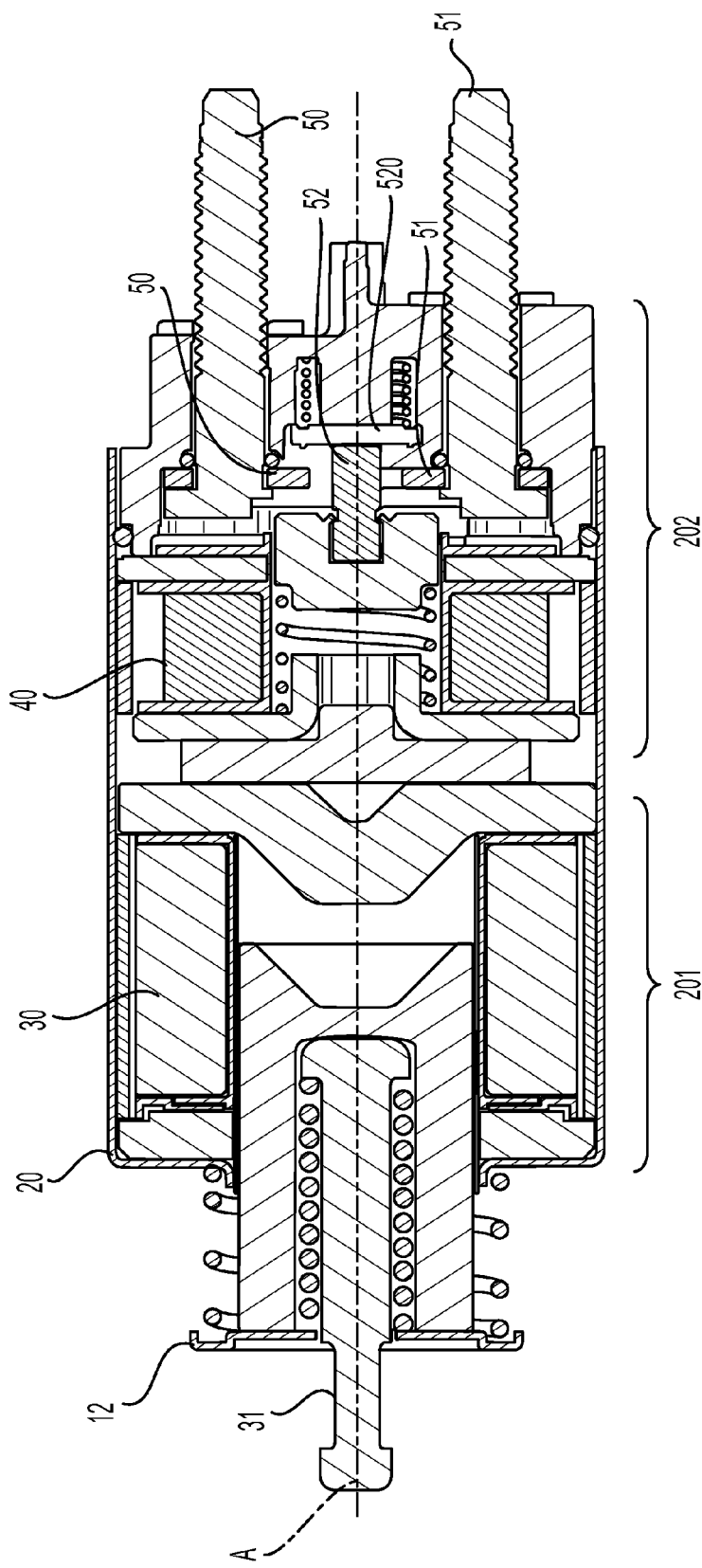
FIG. 2 is a side view of a controller of the starter motor assembly of FIG. 1.

With reference to FIGS. 1 and 2, a starter motor assembly 10 of a vehicle is provided and includes a drive portion 11, a controller 12 and a lever arm 13. The drive portion 11 includes a motor 110, a driveshaft 111, which is drivable by the motor, and a ring gear 112. The ring gear 112 is coupled to a crankshaft of an engine 14 and is disposed for engagement with a pinion of the driveshaft 111 so that the crankshaft and the engine 14 can be driven by the motor 110. The driveshaft 111 is movable by the controller 12 via the lever arm 13 in an axial direction to thereby engage with the ring gear 112 via the pinion.

As shown in FIG. 2, the controller 12 includes a housing 20, a first or drive coil 30 and a second or magnetic-switch (hereinafter referred to as a "mag-switch") coil 40. The housing 20 has a central longitudinal axis A and may be substantially cylindrical in shape. The drive coil 30 is disposed within the housing 20 such that a longitudinal axis of the drive coil 30 may be but is not required to be substantially coaxial with the central longitudinal axis A of the housing 20. The drive coil 30 is configured to drive axial movement of a spring-loaded drive plunger 31 and a distal end of the drive plunger 31 is coupled to the lever arm 13. Thus, the drive coil 30 is configured to control engagement of the driveshaft 111 and the ring gear 112. The mag-switch coil 40 is disposed within the housing 20 such that a longitudinal axis thereof is offset from the central longitudinal axis A of the housing 20 (see FIG. 4). The mag-switch coil 40 is configured to control an application of current to the motor 110.

In accordance with embodiments, the drive coil 30 is arranged in a first end 201 of the housing 20 and the mag-switch coil 40 is arranged in a second end 202 of the housing 20. The first and second ends 201 and 202 of the housing 20 may be opposite from one another.

The controller 12 further includes a first lead 50, a second lead 51 and a spring-loaded mag-switch plunger 52. The first lead 50 is associated with and electrically coupled to a battery of the vehicle. The second lead 51 is associated with and electrically coupled to the motor 110. The mag-switch plunger 52 includes a conductive element 520 and is disposed to occupy first and second positions in accordance with drive movement control exerted thereon by the mag-switch coil 40. With the mag-switch plunger 52 disposed at the first position, the conductive element 520 is displaced from both the first and second leads 50 and 51. By contrast, with the mag-switch plunger 52 disposed at the second position, the conductive element 520 is electrically coupled to both the first and second leads 50 and 51. Thus, since the mag-switch coil 40 is configured to drive movement of the mag-switch plunger 52 between the first and second positions, the mag-switch coil 40 is effectively configured to control the application of the current to the motor 110 from the first lead 50 to the second lead 51.

Figure 5:
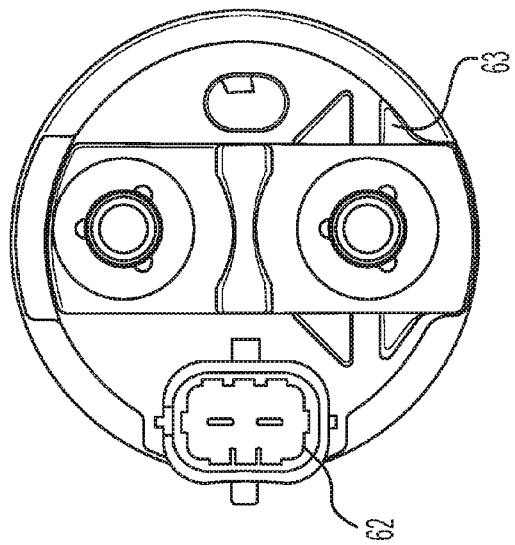
FIG. 5 is an axial view of a cover for the end of the controller of FIG. 2.
Figure 4:
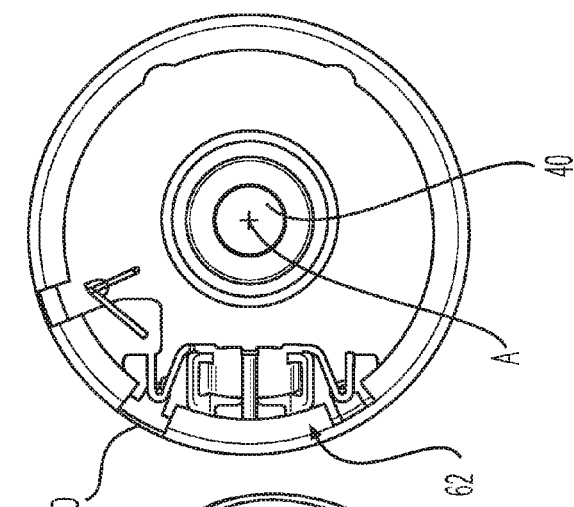
FIG. 4 is an axial view of the end of the controller of FIG. 2.
Figure 3:
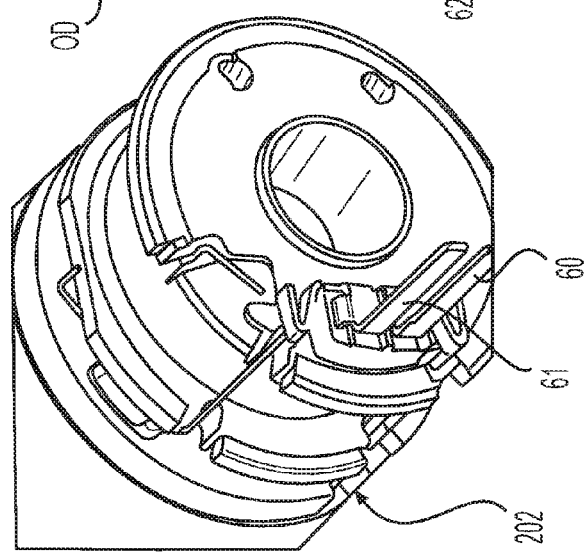
FIG. 3 is a perspective cutaway view of an end of the controller of FIG. 2.

With continued reference to FIGS. 1 and 2 and with additional reference to FIGS. 3-5, the controller 12 further includes coil leads 60, 61, a terminal assembly 62 and a cover 63. The coil leads 60, 61 are each respectively associated with each of the drive coil 30 and the mag-switch coil 40. In particular, the coil leads 60, 61 may be positive leads for the drive coil 30 and the mag-switch coil 40. The terminal assembly 62 includes a plurality of conductive elements to which the coil leads 60, 61 are respectively coupled and is disposed at one end of the housing 20. In accordance with embodiments, the terminal assembly 62 may be disposed at the second end 202 of the housing 20 such that the coil lead 60 of the drive coil 30 is routed from the first end 201 of the housing 20, through a housing center and to the second end 202.

As shown in FIGS. 4 and 5, due to the offsetting of the longitudinal axis of the mag-switch coil 40 with respect to the central longitudinal axis A of the housing 20, additional room at the second end 202 of the housing 20 is available for the terminal assembly 62 and for the first and second leads 50 and 51. Thus, a substantial entirety of the terminal assembly 62 may be is disposed within an outer diameter OD of the housing 20 while the terminal assembly 62, the central longitudinal axis A and a central longitudinal axis of the mag-switch coil 40 are substantially diametrically aligned.

The cover 63 may be provided as a component of the housing 20 or a stand-alone component that is attachable to the housing 20. In any case, the coil leads 60, 61 and the first and second leads 50 and 51 may be disposed to extend through corresponding apertures defined by the cover 60.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A starter motor of a vehicle, comprising:
a housing having a first end, a second end, and a central longitudinal axis; and
at least first and second coils disposed within the housing, the first coil being arranged at the first end, the first coil having a first longitudinal axis and the second coil arranged at the second end, the second coil having a second longitudinal axis that is offset from the first longitudinal axis,
one of the at least first and second coils being configured to control driveshaft and ring gear engagement and the one of the first and second longitudinal axes of the other one of the at least first and second coils being offset from the central longitudinal axis and configured to control an application of current to a motor disposed to drive rotation of a driveshaft of the vehicle, wherein an additional space is defined in the second end of the housing formed by the offset, an electrical lead of at least one of the first and second coils being arranged in the additional space.

2. The starter motor according to claim 1, wherein the housing is substantially cylindrical.

3. The starter motor according to claim 1, wherein the first and second coils are arranged in opposite ends of the housing.

4. The starter motor according to claim 1, further comprising:
first and second leads associated with a battery and motor of the vehicle, respectively; and
a mag-switch plunger including a conductive element and being disposed to occupy first and second positions at which the conductive element is displaced from and electrically coupled to the first and second leads, respectively,
the other one of the at least first and second coils being configured to drive movement of the mag-switch plunger between the first and second positions to control the application of the current to the motor.

5. The starter motor according to claim 4, wherein the mag-switch plunger is spring-loaded.

6. The starter motor according to claim 1, further comprising:
coil leads respectively associated with each of the at least first and second coils; and
a terminal assembly to which the coil leads are respectively coupled, the terminal assembly being disposed at one end of the housing.

7. The start motor according to claim 6, wherein a substantial entirety of the terminal assembly is disposed within an outer diameter of the housing.

8. The starter motor according to claim 6, further comprising first and second leads associated with a battery and a motor of the vehicle, wherein the coil leads and the first and second leads are disposed at a same end of the housing.

9. The starter motor according to claim 8, wherein the housing comprises a cover through which the coil leads and the first and second leads extend.

10. A starter motor assembly of a vehicle, comprising:
a drive portion in which a driveshaft, which is drivable by a motor, is disposed for engagement with a ring gear coupled to a vehicle engine; and
a controller, comprising a housing having a first end, a second end, and a central longitudinal axis and at least first and second coils each including corresponding first and second longitudinal axes, the first being arranged at the first end and second arranged at the second end, the first and second coils being operably disposed within the housing to control driveshaft and ring gear engagement and to control an application of current to the motor, respectively, the second longitudinal axis of the second coil is offset from the central longitudinal axis and the first longitudinal axis of the first coil, wherein an additional space is defined in the second end of the housing formed by the offset, an electrical lead of at least one of the first and second coils being arranged in the additional space.

11. A starter motor assembly of a vehicle, comprising:
a drive portion in which a driveshaft, which is drivable by a motor, is disposed for engagement with a ring gear coupled to a vehicle engine; and
a controller, comprising:
a housing having a first end, a second end, and a central longitudinal axis;
a drive coil disposed within the housing at the first end, the drive coil having a first longitudinal axis that is substantially coaxially aligned with the central longitudinal axis and configured to drive axial movement of a plunger for controlling the driveshaft and ring gear engagement; and
a magnetic-switch coil disposed within the housing at the second end, the magnetic-switch coil having a second longitudinal axis that is offset from the central longitudinal axis and the first longitudinal axis, the magnetic-switch coil being configured to control an application of current to the motor, wherein an additional space is defined in the second end of the housing formed by the offset, a positive lead of at least one of the drive coil and the magnetic-switch coil being arranged in the additional space.

12. The starter motor assembly according to claim 11, wherein the housing is substantially cylindrical and the drive coil and the magnetic-switch coil are arranged in opposite ends of the housing.

13. The starter motor assembly according to claim 11, further comprising:
first and second leads associated with a vehicle battery and the motor; and
a mag-switch plunger including a conductive element and being disposed to occupy first and second positions at which the conductive element is displaced from and electrically coupled to the first and second leads, respectively,
the magnetic-switch coil being configured to drive movement of the mag-switch plunger between the first and second positions to control the application of the current to the motor.

14. The starter motor assembly according to claim 13, wherein the plunger and the mag-switch plunger are each spring-loaded.

15. The starter motor assembly according to claim 11, further comprising:
coil leads respectively associated with each of the drive and magnetic-switch coils; and
a terminal assembly to which the coil leads are respectively coupled, the terminal assembly being disposed at one end of the housing.

16. The start motor assembly according to claim 15, wherein a substantial entirety of the terminal assembly is disposed within an outer diameter of the housing.

17. The starter motor assembly according to claim 15, further comprising first and second leads associated with a vehicle battery and the motor, wherein the coil leads and the first and second leads are disposed at a same end of the housing.

18. The starter motor assembly according to claim 17, wherein the housing comprises a cover through which the coil leads and the first and second leads extend.

* * * * *